United States Patent [19]

Kitchen

[11] Patent Number: 4,601,654
[45] Date of Patent: Jul. 22, 1986

[54] PULSE COMBUSTION APPARATUS

[76] Inventor: John A. Kitchen, R.R. #3, Hastings, Ontario, Canada, K0L 1Y0

[21] Appl. No.: 654,439

[22] Filed: Sep. 26, 1984

[51] Int. Cl.[4] .............................................. F23C 11/04
[52] U.S. Cl. ........................................ 431/1; 126/112; 126/116 R
[58] Field of Search .................. 431/1, 114, 215, 207; 122/24; 126/110 R, 116 A, 112, 117; 60/247, 39.76, 39.77

[56] References Cited

U.S. PATENT DOCUMENTS 3,209,738 10/1965 Powers .
4,241,874 12/1980 Schossow ........................ 126/117 X
4,336,791 6/1982 Kitchen ............................... 431/1 X
4,477,246 10/1984 Hisaoka et al. ..................... 431/1 X

FOREIGN PATENT DOCUMENTS 810432 3/1959 United Kingdom .................... 431/1

Primary Examiner—Randall L. Green
Attorney, Agent, or Firm—Rogers, Bereskin & Parr

[57] ABSTRACT

A pulse combustion apparatus in which combustion air is brought into heat exchange relationship with the exhaust system of the apparatus for preheating the combustion air prior to entering the combustion chamber. In a preferred embodiment this is achieved by passing the combustion air through a space between an exhaust cushion chamber of the exhaust system and a housing which encloses the chamber.

7 Claims, 7 Drawing Figures

PULSE COMBUSTION APPARATUS

BACKGROUND OF THE INVENTION

1. Field of the Invention

This invention relates generally to pulse combustion apparatus (for example with heaters of the pulse combustion type) and is more particularly concerned with improvements in and relating to exhaust systems for pulse combustion apparatus.

2. Description of Prior Art

United States patent literature contains numerous examples of prior art pulse combustion apparatus. Typically, such an apparatus includes a combustion chamber and an exhaust pipe which which forms a resonant system with the combustion chamber. the apparatus operates on a cycle in which a fuel charge is admitted to the combustion chamber and ignited. The charge then expands into the exhaust pipe causing a partial vaccum transient in the combustion chamber, which both assists in drawing in a fresh fuel charge and causes high temperature gas to be drawn back into the combustion chamber from the exhaust pipe. The fresh fuel charge is ignited spontaneously from flame fronts in the returning high temperature gas, thereby establishing the next cycle. Accordingly, the apparatus is self-sustaining after initial ignition. In a pulse combustion heater, a fluid to be heated is brought into heat exchange relationship with the exhaust pipe; usually, a heat exchanger is provided downstream of the exhaust pipe to improve the efficiency of heat transfer from the combustion gases to the fluid.

By way of example, pulse combustion heaters are disclosed in my U.S. Pats. Nos. 3,267,985, 4,241,720 and 4,241,723. The various forms of apparatus disclosed are intended primarily (but not exclusively) for use as boilers, i.e. for heating water. However, it has been proposed to use this type of apparatus specifically for heating air. Examples of this type of apparatus are shown in my U.S. Pats. Nos. 2,916,032, 4,309,977 and 4,336,791.

An object of the present invention is to provide improvements in and relating to exhaust systems for pulse combustion apparatus.

BRIEF DESCRIPTION OF INVENTION

In one aspect, the invention provides a pulse combustion apparatus having a combustion chamber, an exhaust system including an exhaust pipe forming a resonant system with the combustion chamber, means for admitting successive fuel charges to the chamber and ignition means operable to initiate combustion in the chamber. Pursuant to the invention, the means for admitting successive fuel charges to the chamber includes combustion air supply means communicating with the combustion chamber and adapted to bring incoming combustion air into heat exchange relationship with the exhaust system for preheating the combustion air.

Preheating the combustion air has the effect of raising the temperature of the combustion gases, which improves the efficiency of combustion. Cooling of the exhaust gases also takes place, increases condensation of moisture from those gases. This is advantageous because the latent heat of vaporization of the moisture is thereby recovered within the apparatus rather than being dissipated outside the apparatus (where the moisture would otherwise be exhausted with the exhaust gases), and is particularly significant where the pulse combustion apparatus is used as a heater for water or air, for example, generally in accordance with the disclosures of my United States Patents identified above.

Pre-heating of the combustion air also has the effect of lowering the relative humidity of the air, which will reduce corrosion within the apparatus.

Another aspect of the invention involves the provision of means, within the exhaust system, for removing condensed water from the apparatus. These means include a condensate drain pipe and an exhaust gas trap comprising a chamber coupled to said pipe for receiving exhaust gas and condensate from said pipe and having a condensate drain outlet and a float valve in said chamber positioned to close said condensate drain outlet and prevent escape of exhaust gas from the apparatus when the condensate within said chamber falls below a predetermined level.

Another aspect of the invention provides an improvement in the exhaust system of the pulse combustion apparatus in the form of means upstream of the exhaust gas outlet from the apparatus for removing water droplets from exhaust gases flowing through the exhaust system. These means include a chamber for receiving the exhaust gases and having an outlet formed by a tubular member arranged in a generally upright position in said chamber and having an open upper end communicating with said exhaust gas outlet of the apparatus and an inlet formed by an opening in a wall of the tubular member shaped to promote flow of gases towards said open upper end of the member as a vortex, so that water droplets in the gases tend to collect at the interior surface of the tubular member and flow downwardly of said surface by gravity. The tubular member is also provided with means for preventing upward flow of water out of the tubular member and drainage means for removal of collected water from a lower end of the member.

A still further aspect of the invention provides a method of dispersing exhaust gases from a pulse combustion apparatus having an exhaust outlet, in which a perforated dispersion pipe is provided at a location below ground level and outside a building in which the apparatus is installed. A vent pipe is connected between the pulse combustion gas outlet and the dispersion pipe and a bed of particulate material is provided around the pipe and is selected so that the back pressure on the exhaust system is lower than the maximum which can be tolerated by the pulse combustion apparatus. The invention also provides an installation in accordance with the method and an exhaust gas vent system for a pulse combustion apparatus.

BRIEF DESCRIPTION OF DRAWINGS

In order that the invention may be more clearly understood, reference will now be made to the accompanying drawings which illustrate a number of preferred embodiments of the invention by way of example, and in which.

DESCRIPTION OF THE PREFERRED EMBODIMENTS

Figure 1:
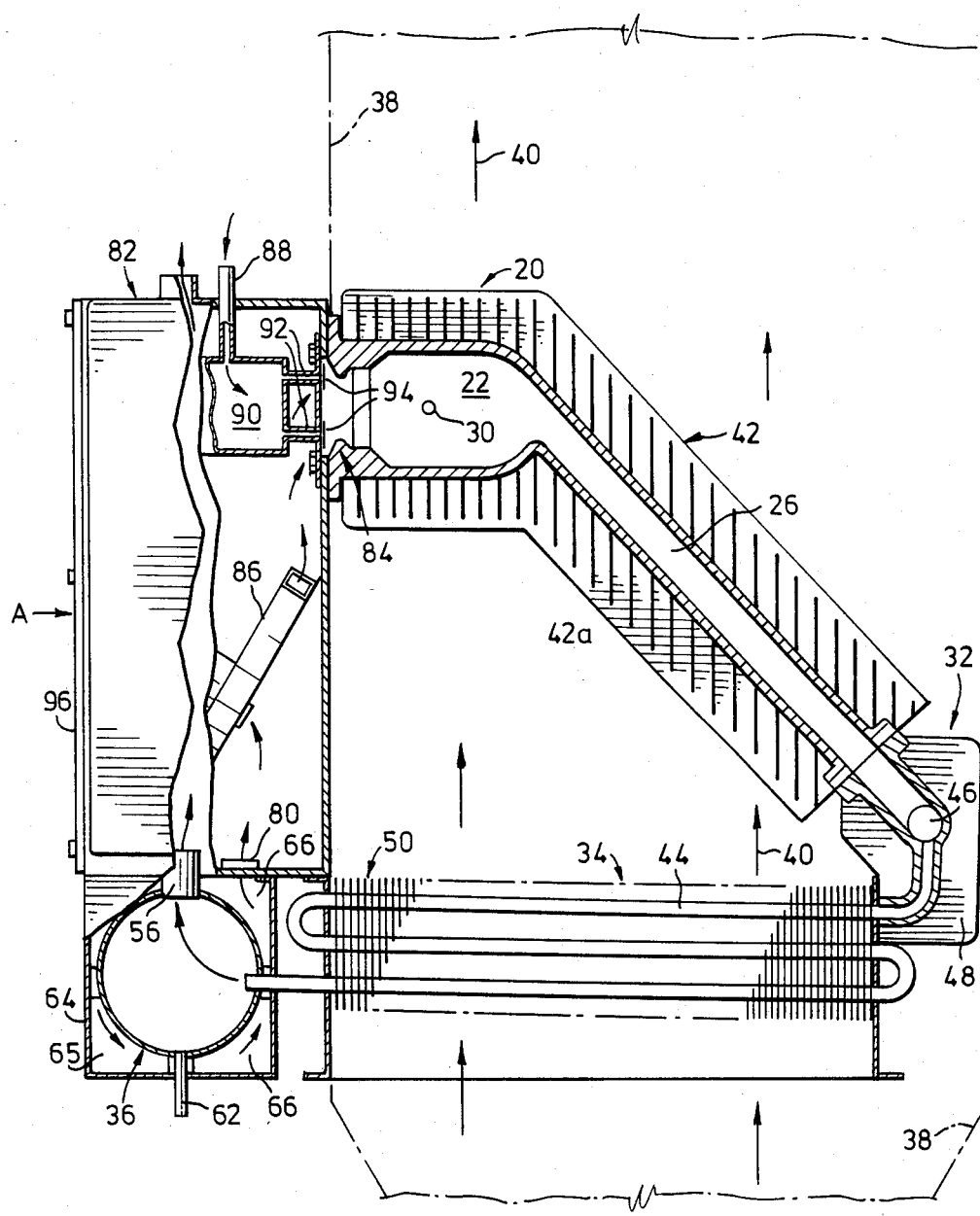
FIG. 1 is a side elevational view, partly in section, of a pulse combustion apparatus suitable for use as an air heater, in accordance with the present invention.

Referring first to FIGS. 1 to 4, these views show a pulse combustion air heater of the general type described and claimed in my U.S. Pats. Nos. 4,309,977 and 4,336,791. The apparatus is generally denoted by reference numeral 20 and includes a combustion chamber 22, and an exhaust system 24 including an exhaust pipe 26, which forms a resonant system with the chamber. Means (to be described) are provided for admitted successive fuel charges to the chamber, and the apparatus also includes ignition means operable to initiate combustion in the chamber, in this case represented by a spark plug 30.

The exhaust system includes a manifold 32 by which the exhaust pipe 26 is coupled to a heat exchanger 34. The heat exchanger discharges exhaust gases into an exhaust cushion chamber 36 and the gases are exhausted from the system after leaving the chamber 36.

As described in the patents identified above, air to be heated is blown by an external blower (not shown) through duct work indicated in ghost outline 38, up through the heat exchanger 34 and over the exhaust pipe 26 and combustion chamber 22, as indicated by the arrows 40 in FIG. 1. When the pulse combustion apparatus is in operation, the heat produced by combustion in chamber 22 is transferred to this air and the air is then delivered to the location at which heat is required.

In principle the pulse combustion apparatus itself is constructed and operates as described in U.S. Pats. Nos. 4,309,977 and 4,336,791, with the exception that the means for admitting successive fuel charges to the combustion chamber is designed to bring incoming combustion air into heat exchange relationship with the exhaust system (in this case by way of the exhaust cushion chamber 36) for preheating the combustion air as will be described later. Accordingly, constructional details of those parts of the pulse combustion apparatus which are referred to in these patents have not been included in the present application and reference may be made to those patents for such details. The disclosures of both patents are incorporated herein by reference.

Figure 2:
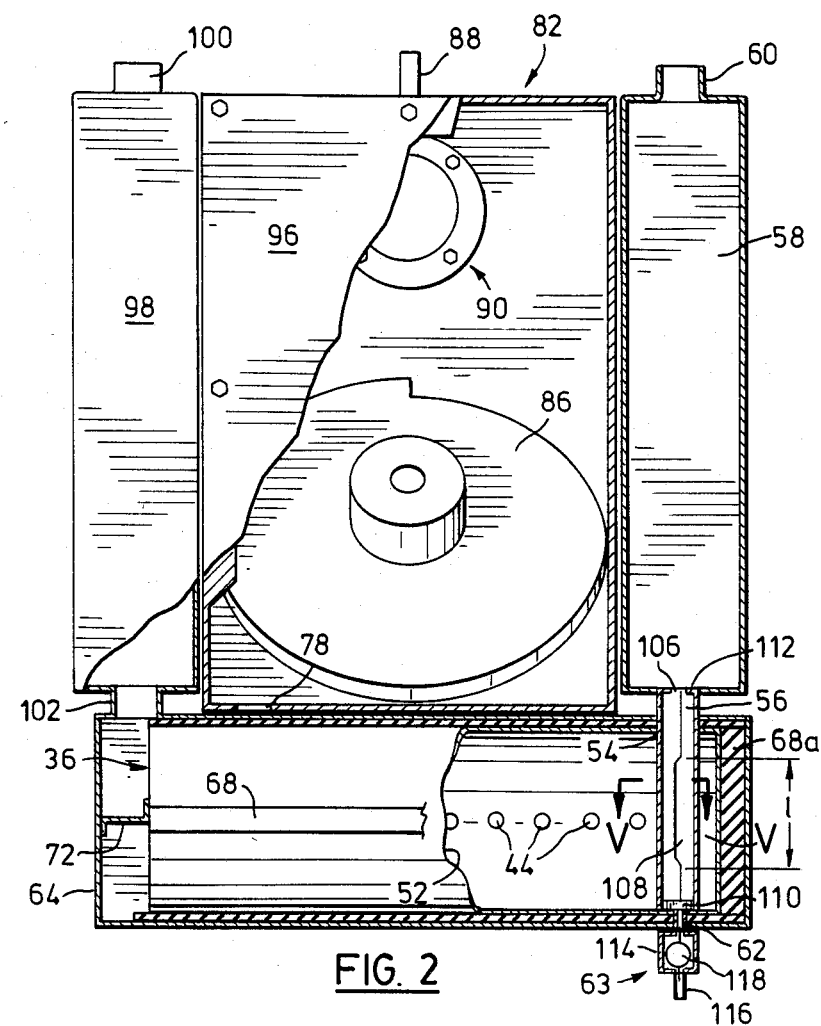
FIG. 2 is an elevational view, partly in section, in the direction of arrow A in FIG. 1.

Design differences in the apparatus of FIGS. 1 and 2 as compared with the prior patents include a somewhat different configuration for the exhaust pipe 26, designed to improve heat transfer to the air represented by arrows 40. Thus, as shown in FIG. 1, the exhaust pipe 26 extends generally tangentially from combustion chamber 22 and obliquely across the air passageway through which air 40 flows. Heat radiating fins are formed on the exhaust pipe 26 and combustion chamber 22 for improved transfer of heat to this air. Some of the fins are individually denoted 42a and encircle the exhaust pipe 26 and combustion chamber 22. Manifold 32 connects the single exhaust pipe 26 from combustion chamber 22 with a plurality of heat exchanger tubes 44. The tubes 44 all communicate with a single transverse passageway 46 in the manifold and exhaust pipe 26 also communicates with that passageway generally centrally of its length. Again, manifold 32 is provided with a series of parallel heat radiating fins 48 which in this case are aluminum castings formed directly on the manifold.

The heat exchanger tubes 34 extend parallel to one another generally in a convoluted S-shaped path from the manifold 32 to the exhaust cushion chamber 36. Aluminum fins on the tubes generally indicated at 50 provide heat radiating surfaces and permit air flow through the heat exchanger.

In FIG. 2, part of the exhaust cushion chamber 36 has been broken away at line 52 to show end portions of some of the heat exchanger tubes entering the exhaust cushion chamber (as indicated by reference numeral 44). Chamber 36 has a single outlet 54 through which exhaust gases leave the exhaust cushion chamber and the outlet is fitted with a tubular member 56 which communicates with an exhaust muffler 58 having at its upper end a main exhaust outlet 60 from the apparatus. Member 56 is designed to remove water droplets from exhaust gases leaving chamber 36, as will be described later.

An exhaust cushion chamber in a pulse combustion apparatus receives pulsating exhaust gas waves from the combustion chamber via the remainder of the exhaust system and provides an enlarged space for accommodating and smoothing out those pulsations before the exhaust gases are discharged from the apparatus. This assists in noise attenuation. At the same time, moisture within the exhausted gases tend to condense within the exhaust cushion chamber so that the latent heat of vaporization of the moisture is given up before the exhaust gases are discharged. Nevertheless, in a prior art pulse combustion apparatus, substantial amounts of moisture are exhausted from the apparatus. One objective of the present invention is to promote additional condensation within the exhaust cushion chamber and thereby retain within the system some of what would otherwise be waste heat. In FIG. 2 a condensate drain from the exhaust cushion chamber is shown at 62 and is provided with an exhaust gas trap 63 (to be described later).

Figure 3:
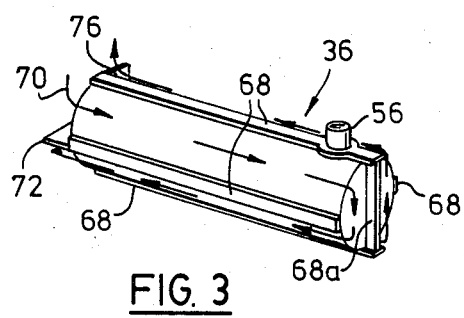
FIG. 3 is a perspective view of the exhaust cushion chamber of the apparatus of FIGS. 1 and 2.

Exhaust cushion chamber 36 is shown separate from the remainder of the apparatus in FIG. 3 and it will be seen from that view that the chamber is of generally cylindrical shape. As best seen in FIG. 1, chamber 36 is received within a rectangular housing 64 dimensioned to provide a space 66 around chamber 36 through which combustion air is conducted for preheating, when the apparatus is in operation.

Space 66 is, in fact, divided by partitions indicated at 68 in FIGS. 1 and 3 to define a spiral or serpentine path for combustion air to flow over the external surface of the exhaust cushion chamber 36. The partitions are, in fact, formed by rubber strips which extend longitudinally of the surface of chamber 36 and are spaced generally by 90° angularly about the chamber. Combustion air enters space 66 at a position indicated at 70 in FIG. 3 adjacent one end of chamber 36. At the opposite end of the chamber, the rubber strips 68 at the top and bottom of the chamber are joined by an end portion 68a which effectively divides space 66 into two areas at opposite sides of chamber 36. In operation, this causes the incoming air to be deflected downwardly and reversed as indicated by the arrows in FIG. 3 at the end of chamber 36 remote from inlet 70. The air then travels back towards the inlet but is prevented from mixing with the incoming air by a horizontal partition 72 extending between the relevant end of chamber 36 and the external housing 64 as best seen in FIG. 2. The direction of flow of the combustion air is then again reversed and the air flows along the bottom of the far side of chamber 36 as seen in FIG. 3.

Arrows 74 indicate that the air then flows upwardly and back towards the inlet end of space 66. A further partition 76 again prevents mixing of that air with the incoming air. An opening 78 (see FIGS. 1 and 2) in housing 64 permits the combustion air to then leave space 66. Opening 78 mates with an air inlet 80 best shown in FIG. 1 to a main housing section 82 of the apparatus. Combustion chamber 22 has an inlet generally indicated at 84 which communicates with the interior of housing section 82 and the combustion chamber draws its combustion air from the interior of that housing section. A blower 86 within section 82 is provided for starting purposes as described in the patents identified above; after starting, blower 86 is switched off and the air is simply drawn into combustion chamber 22 through the blower as required by the pulsating cycle of the apparatus.

In this case, the apparatus is designed to operate using gas as a fuel. The gas is delivered through a pipe 88 to a gas cushion chamber 90 from which it is then drawn into the combustion chamber through a series of tubes, two of which are indicated at 92. Combustion air is drawn into the combustion chamber around tubes 92 and the entry of both air and gas (fuel charges) is controlled by pressure sensitive valves, two of which are indicated at 94. Again, reference may be had to the patents referred to previously for details of the valve constructions.

In FIG. 2, a cover 96 for the main housing section 92 has been broken away to show the blower 86 and the gas cushion chamber 90. Arrows within housing section 82 indicate air flowing to the gas cushion chamber 90 through blower 86. The blower is designed so that air flow will continue even when the blower is not operating.

FIG. 2 (and FIG. 1) also illustrate the fact that the main housing section 82 is supported on the housing 64 for the exhaust cushion chamber 36. The exhaust muffler 58 discussed previously is also supported on housing 64 at one side of housing section 82 and an intake muffler 98 is mounted on housing 64 on the opposite side of housing section 82. The muffler has a main combustion air inlet at 100 and an outlet 102 which communicates with an opening housing 64 at the combustion air inlet position denoted 70 in FIGS. 2 and 3.

It will be apparent from FIG. 1, that the main housing section 82 is of rectangular shape in plan. The two mufflers 58 and 98 are of similar shape and are of a width (in the plane of FIG. 1) equal to the width of the main housing section 82. The two mufflers are shown simply as internally open chambers although internal baffles or other noise attenuating devices may be used in practice. On the other hand, at least insofar as the intake muffler 98 is concerned, tests have shown that the illustrated design in which combustion air flows around the exhaust cushion chamber also has the effect of attenuating intake noise which may even make muffler 98 unnecessary.

When the pulse combustion apparatus is in operation, combustion air will be drawn in through muffler 98 (initially by blower 86 during starting and later by the combustion cycle in chamber 22). The incoming air will flow in a serpentine or spiral path through the "labyrinth" formed around the exhaust cushion chamber as best shown in FIG. 3. Once combustion has been established and chamber 36 has become heated by the exhaust gases flowing therethrough, heat transfer will take place from those gases to the incoming combustion air. The combustion air will be heated while the exhausted gases will be cooled. This latter fact will result in additional condensation of moisture within chamber 36, (as compared with an equivalent prior art arrangement) with the result that the exhaust gases will give up additional heat to the system. Condensate will be removed through drain 62. The heated combustion air will then flow into the main housing section 82 through blower 86 and into the combustion chamber through inlet 84. The temperature of the combustion air will be raised as compared with an identical system in which the combustion air is delivered directly to the combustion chamber without preheating. This will mean that the relative humidity of the air will be lowered and that the housing and internal components of the apparatus will be warmed somewhat which will reduce the tendency for moisture to condense from the combustion air during "off" periods of the pulse combustion cycle. These factors will reduce corrosion within the main housing section 82 and in the combustion chamber and exhaust system. As a result of preheating combustion air, the temperature of the combustion gases will be raised somewhat (at least upstream of chamber 36), which will keep more heat in the system than would otherwise be the case and improve the efficiency of heat transfer from the combustion gases to the air to be heated.

Figure 4:
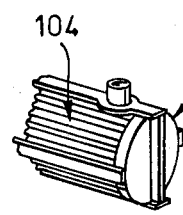
FIG. 4 is a view similar to part of FIG. 3 showing an alternative embodiment of the invention.

FIG. 4 shows a modification of the exhaust cushion chamber 36 (denoted 36'), in which the external surface of chamber 36 has been formed with longitudinal corrugations 104 to increase the surface area of the combustion chamber across which heat transfer can take place, which is believed will lead to a further increase in efficiency.

Figure 5:
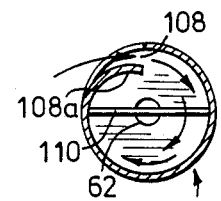
FIG. 5 is a section view on line V—V of FIG. 2.

Further improvements as compared with the prior art (including my patents identified above) are shown in FIG. 2 of the drawings. These improvements include the provision of an exhaust gas trap as indicated at 63 on the condensate drain from the exhaust cushion chamber and means for removing water droplets from exhaust gases leaving that chamber. As noted previously, these latter means include a tubular member 56 in the outlet 54 from the exhaust cushion chamber 36. This tubular member is disposed in a generally upright position in the chamber and is fitted at its upper end into the lower end of the exhaust muffler 58. The member has an open upper end 106 which communicates with the exhaust gas outlet 60 of the apparatus. An opening 108 is formed in the wall of the tubular member and forms an inlet through which exhaust gases can flow from the exhaust cushion chamber, into member 56; from there, the exhaust gases can leave the member 56 through its open upper end 106, and flow into the exhaust muffler 58. Opening 108 is shaped to promote flow of gases towards the open upper end of the tube as a vortex so that water droplets in the gases tend to collect at the interior surface of the tubular member due to the effect of centrifugal force. This vortex flow is achieved by approximately shaping opening 108 as best seen in FIG. 5 so that incoming gases tend to flow generally tangentially into member 56 (as seen in section) and swirl around inside the number adjacent its interior surface. In the illustrated embodiment, member 56 is a thin walled, seamed stainless steel tube and inlet 108 is formed by inwardly deflecting a portion of the tube adjacent the seam as indicated at 108a in FIG. 5. The length over which this portion of the tube is deflected is denoted 1 in FIG. 2.

Water droplets which collect at the interior surface of tubular member 56, then flow down by gravity towards the lower end of the member. A transverse baffle 110 extends generally diametrically across the lower end portion of member 56 to break the vortex flow within the member. The member is positioned over condensate drain 62 so that the droplets can then flow out of drain 62 and into the exhaust trap 63 along with moisture which is condensed from the exhaust gases in chamber 36.

An annular member 112 is provided in the upper end of member 56 to inhibit any tendency water droplets on the interior surface of member 56 might have to flow upwardly with the exhaust gases.

Figure 7:
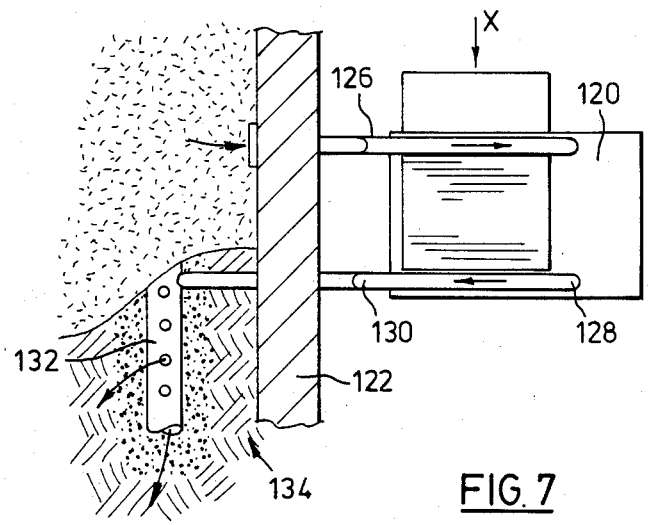
FIG. 7 is a plan view corresponding to FIG. 6.
Figure 6:
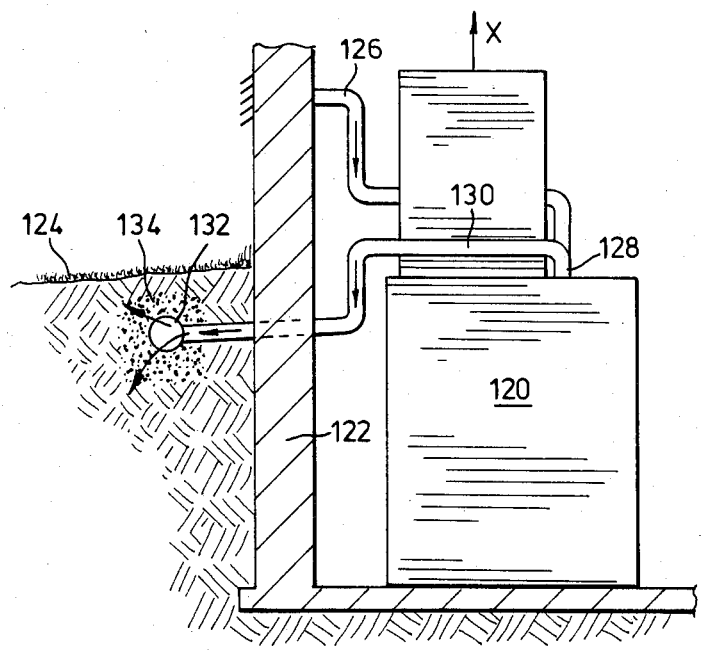
FIG. 6 is a diagrammatic elevational view showing a pulse combustion installation provided with an exhaust gas vent system in accordance with the invention.

It is believed that the provision of means within the exhaust system for removing water droplets from exhaust gases leaving the apparatus represents a significant advantage as compared with the prior art in that it will avoid, or at least reduce emission of water spray from the apparatus. In existing forms of pulse combustion apparatus, it is found that a noticeable water spray is emitted with exhaust gases, due to the presence of significant amounts of water in the gaseous fuels typically used. While this is generally not a major problem, under freezing conditions, it can result in the formation of blocks of ice outwardly of the exhaust outlet of the apparatus. FIGS. 6 and 7 (to be described) also address this problem.

With continued reference to FIG. 2, it will be seen that the exhaust gas trap 63 comprises a chamber 114 which, in this embodiment, is secured to the exhaust cushion chamber housing 64 around the condensate drain pipe 62 so that liquid from chamber 36, and any exhaust gases which may seep out of pipe 62, will enter chamber 114. Chamber 114 itself has a condensate drain outlet 116 and a float valve 118 is provided in chamber 114 and is positioned to close outlet 116 and prevent escape of exhaust gases when the liquid within chamber 114 falls below a predetermined level. This will seal outlet 116 against escape of exhaust gases. When the water level in chamber 114 rises to an extent sufficient to cause float 118 to rise clear of outlet 116, then the liquid itself will form a seal preventing escape of exhaust gases. Again, in practice, escape of exhaust gases through the condensate drain in a prior art apparatus is not regarded as a major problem because the amount of gas that may escape is quite small. However, the exhaust gas trap 63 does provide an additional safety feature against any possible danger from this source.

Turning now to FIGS. 6 and 7, these views illustrate diagrammatically an installation comprising a pulse combustion heater installed within a building, and an improved method of dispersing exhaust gases from the apparatus. The method not only addresses the problem of moisture emissions from the apparatus as discussed above, but also aids in dispersing the exhaust gases themselves, and in attenuating noise.

As seen in FIGS. 6 and 7, the pulse combustion apparatus is generally denoted by reference numeral 120 and is shown installed inside a building having an external wall 122 which is partly below ground level, indicated by reference numeral 124. The apparatus has a combustion air inlet 126 which extends through wall 122 for bringing ambient air to the apparatus 120 for combustion. The apparatus also has an exhaust outlet 128 (for example, equivalent to the outlet 60 shown in FIG. 2) and the outlet is fitted with a vent pipe 130 which also extends through the wall 122 of the building but below ground level. Room air is circulated through the heater as indicated by the arrows X.

A perforated dispersion pipe 132 is provided at a location below ground level and the vent pipe 130 is connected to pipe 132 so that exhaust gases and moisture leaving apparatus 120 will flow into the interior of the pipe 132 and be dispersed outwardly through its perforations. Pipe 132 is buried in a bed 134 of particulate material such as gravel, selected so that the back pressure imposed on the exhaust of the apparatus is below the maximum back pressure which the apparatus can tolerate. In a typical pulse combustion installation using an apparatus in accordance with the invention, or in accordance with one or more of my patents identified above, this maximum tolerable back pressure might be of the order of one inch water guage. This is due to the relatively strong cycle of the apparatus but in other forms of apparatus having a weak cycle, the maximum tolerable back pressure would be much lower. In the present case, it has been found that a gravel bed at a depth, of say one foot below ground level, will provide a relatively low back pressure (perhaps of the order of one quarter inch water gauge) which is found to have a negligible effect on the operation of the apparatus.

In any event, it is found that by venting exhaust gases as shown in FIGS. 6 and 7, the moisture within the gases is readily dispersed into the soil, thereby completely avoiding the spray problem referred to above, and at the same time the gases themselves disperse through the ground and are at least partly absorbed with the result that there is virtually no noticeable effect at ground level, except, possibly, a slight acidic effect on the soil. In practical tests, this has been found to be insignificant and certainly would not be noticeable in alkaline soil areas (e.g. having limestone). In most cases, a beneficial effect has even been noticed due to the presence of additional amounts of water and carbon dioxide in the soil. In addition to these advantages, it has been found that substantial noise attenuation is achieved using the vent arrangement provided by the invention.

The particular from of dispersion pipe 132 and the gravel bed 134 in which it is located are not believed to be critical, subject to the requirement that they should not present intolerable back pressure to the apparatus and the perforations in the pipe should not become plugged with time. In a practical installation, two ten foot lengths of perforated ABS plastic pipe of the type used for weeping tile was used and one and a half inch PVC pipe was used for the vent pipe 130. The ends of the dispersion pipe 132 were closed by means of rocks, mainly to prevent plugging of the pipe by the soil but in a commercially manufactured system, the pipe would probably be permanently capped at its ends. In FIG. 7, the vent pipe 130 is shown coupled to an end portion of the dispersion pipe 132 but again this is not believed to be critical.

It will, of course, be appreciated that the preceding description relates to particular preferred embodiments of the invention only and that many modifications are possible within the broad scope of the invention.

For example, the preceding description relates specifically to air furnaces, while it is to be understood that similar principles may be applied both to boilers and to pulse combustion apparatus for purposes other than heating (e.g. power sources). It should also be noted that other arrangements may be envisaged for bringing the incoming combustion air into heat exchange relationship with the exhaust system. It is believed that the preferred arrangement is to cause the combustion air to flow around the exhaust cushion chamber but a similar effect could be achieved at other points in the exhaust system. Where heat transfer does take place at the exhaust cushion chamber, it is not essential to employ the serpentine or spiral combustion air flow pattern described above although again this is believed to be preferred because, at least in the illustrated embodiment, it results in the formation of relatively narrow passageways for the combustion air which causes the air to be accelerated for good heat transfer. The described arrangement of longitudinal partitions in the space around the exhaust cushion chamber allows this to be accomplished in relatively straightforward manner and avoids the need to resort to costly expedients such as the formation of spiral vanes or other forms of air passageway around chamber 36.

The described means including tubular member 56 for removing water droplets from the exhaust, and the exhaust gas trap 63 are optional. Those features can be used individually or in combination in other forms of pulse combustion apparatus, for example, as disclosed in my patents referred to above. Also, the vent system of FIGS. 6 and 7 can be used with other forms of apparatus. For example, in an apparatus vented in accordance with FIGS. 6 and 7, it probably would be unnecessary to provide means for removing water droplets from the exhaust gases because the water would be dispersed into the soil. In that event, tubular member 56 could be replaced by a plain short tube simply connecting the cushion chamber 36 to the exhaust muffler 58.

I claim:

1. A pulse combustion apparatus comprising:
   a combustion chamber;
   an exhaust system including an exhaust pipe forming a resonant system with the combustion chamber and a generally cylindrical exhaust cushion chamber downstream of the exhaust pipe for receiving combustion gases from said pipe and communicating with an exhaust outlet form the apparatus;
   means for delivering successive fuel charges to said chamber;
   combustion air supply means including a housing of generally rectangular, box shape enclosing said exhaust cushion chamber and defining a space around the chamber through which combustion air can be conducted from an air inlet to said combustion chamber for permitting heat exchange between exhaust gases in said exhaust cushion chamber and the combustion air when the apparatus is in operation, for pre-heating the combustion air;
   means adapted to cause combustion air to flow in a convoluted path in said space for promoting improved heat transfer between exhaust gases in said chamber and said combustion air, said means comprising partitions between said exhaust cushion chamber and housing extending generally longitudinally of the exhaust cushion chamber and arranged to cause said combustion air to flow alternately from end to end of said chamber in said convoluted path;
   a main housing section supported on said exhaust cushion chamber housing and supporting said combustion chamber, and inlet and exhaust mufflers supported on said exhaust cushion chamber housing on opposite sides of said main housing section, said inlet muffler providing communication between a main air inlet and said space between the exhaust cushion chamber and its housing, said space additionally communicating with said combustion chamber by way of the interior of said main housing section, and said exhaust cushion chamber communicating with a main exhaust outlet from the apparatus by way of said exhaust muffler; and,
   ignition means operable to initiate combustion in said combustion chamber.

2. An apparatus as claimed in claim 1, wherein the exhaust system includes a heat exchanger between the exhaust pipe and the exhaust cushion chamber and means for bringing a fluid to be heated into heat exchange relationship with the heat exchanger when the apparatus is in operation.

3. An apparatus as claimed in claim 1, wherein said exhaust cushion chamber has an external surface formed with corrugations providing increased surface area for heat transfer between exhaust gases in said chamber and combustion air in said space.

4. An apparatus as claimed in claim 1,
   wherein said exhaust system includes means for removing condensed water, said means including a condensate drain pipe and an exhaust gas trap comprising a chamber communicating with said pipe for receiving exhaust gas and condensate from said pipe and having a condensate drain outlet and a float valve in said chamber arranged to close said condensate drain outlet and prevent escape of exhaust gas from the apparatus when the condensate within the chamber falls below a predetermined level, said float rising to permit condensate to drain when the condensate within the chamber rises above said predetermined level.

5. An apparatus as claimed in claim 4, wherein said condensate drain pipe depends from said exhaust cushion chamber.

6. A pulse combustion apparatus comprising:
   a combustion chamber;
   an exhaust system including an exhaust pipe forming a resonant system with the combustion chamber and a generally cylindrical exhaust cushion chamber downstream of the exhaust pipe for receiving combustion gases from said pipe and communicating with an exhaust outlet from the apparatus;
   means for delivering successive fuel charges to said chamber
   combustion air supply means including a housing of generally rectangular, box shape enclosing said exhaust cushion chamber and defining a space around the chamber through which combustion air can be conducted from an air inlet to said combustion chamber for permitting heat exchange between exhaust gases in said exhaust cushion chamber and the combustion air when the apparatus is in operation, for pre-heating the combustion air;
   means adapted to cause combustion air to flow in a convoluted path in said space for promoting improved heat transfer between exhaust gases in said chamber and said combustion air, said means comprising partitions between said exhaust cushion chamber and housing extending generally longitudinally of the exhaust cushion chamber and arranged to cause said combustion air to flow alternately from end to end of said chamber in sid convoluted path;
   a main housing section supported on said exhaust cushion chamber housing and supporting said combustion chamber, an exhaust muffler supported on said exhaust cushion chamber housing at a side of said main housing section, said space between the exhaust cushion chamber and its housing communicating with said combustion chamber by way of the interior of said main housing section, and said exhaust cushion chamber communicating with a main exhaust outlet from the apparatus by way of said exhaust muffler; and, ignition means operable to initiate combustion in said combustion chamber;

wherein the exhaust system further includes means upstream of said exhaust outlet for removing water droplets from exhaust gases flowing through the exhaust system, said means for removing water droplets including said exhaust cushion chamber and an outlet from said exhaust cushion chamber formed by a tubular member arranged in the generally upright position and having an open upper end communicating with said exhaust outlet and an inlet formed by an opening in a wall of said tubular member shaped to promote the flow of gases towards said open upper end of the member as a vortex, so that water droplets in the gases tend to collect on the interior surface of the tubular member and flow downwardly thereon by gravity and wherein said tubular member is provided with means for preventing upward flow of water droplets out of the tube and drainage means for removal of collected water.

7. An apparatus as claimed in claim 6, wherein said drainage means includes a condensate drain pipe and an exhaust gas trap comprising a chamber communicating with said pipe for receiving exhaust gases and condensate from said pipe and having a condensate drain outlet, and a float valve in said chamber positioned to close said condensate drain outlet and prevent escape of exhaust gases from the apparatus when the condensate within said chamber falls below a predetermined level.

* * * * *